United States Patent [19]
Van Order et al.

[11] Patent Number: 5,473,516
[45] Date of Patent: Dec. 5, 1995

[54] VEHICLE VISOR

[75] Inventors: Kim L. Van Order, Hamilton; Brian L. Spoelman, Hudsonville, both of Mich.

[73] Assignee: Prince Corporation, Holland, Mich.

[21] Appl. No.: 321,054

[22] Filed: Oct. 5, 1994

[51] Int. Cl.[6] ................................................. B60Q 3/00
[52] U.S. Cl. ........................ 362/83.1; 362/135; 362/311; 362/330
[58] Field of Search .................... 362/80.1, 83.1, 362/135, 311, 330, 339; 359/15, 19

[56] References Cited

U.S. PATENT DOCUMENTS

| | | |
|---|---|---|
| D. 324,111 | 2/1992 | Arbisi . |
| 4,000,404 | 12/1976 | Marcus ................................ 362/135 |
| 4,421,355 | 12/1983 | Marcus . |
| 4,486,829 | 12/1984 | Marcus et al. . |
| 4,536,833 | 8/1985 | Davis ................................. 362/330 |
| 4,916,593 | 4/1990 | Moss et al. ......................... 362/80.1 |
| 5,186,533 | 2/1993 | Hori .................................. 362/80.1 |
| 5,347,435 | 9/1994 | Smith et al. ........................ 362/80.1 |
| 5,365,354 | 11/1994 | Jannson et al. ..................... 359/15 |

OTHER PUBLICATIONS

Exhibit B is a paper entitled "Holographic Light Shaping Diffusers" presented in Feb. 1994 by employees of Physical Optics Corporation, Torrance, Calif., disclosing information on holographic diffusing lenses.
Exhibit A is a product brochure entitled "Holographic Diffusers" published by Physical Optics Corporation, Torrance, Calif., disclosing holographic diffuser technology and its properties, publication date unknown but the price list being dated May 1, 1994.

Primary Examiner—Ira S. Lazarus
Assistant Examiner—Sara Sachie Raab
Attorney, Agent, or Firm—Price, Heneveld, Cooper, DeWitt & Litton

[57] ABSTRACT

A vehicle visor includes a visor body for attachment to a vehicle, a mirror and a light source mounted to the body, and a lens attached to the body for controlling the distribution of light from the light source. The lens includes a surface with microvariations formed therein to define a holographic optical element that directs the light into a predetermined pattern for illuminating the face of the user. The lens so formed eliminates undesirable uneven light distribution such as "spider webbing," light/dark patchiness and chromatic aberrations in and around the predetermined light pattern.

20 Claims, 4 Drawing Sheets

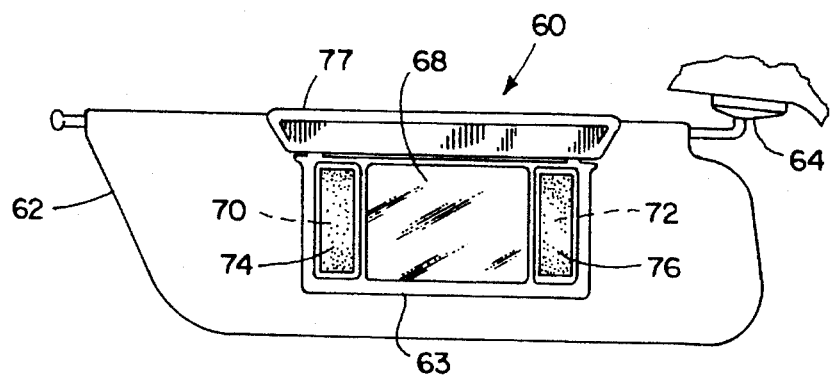
FIG. 7
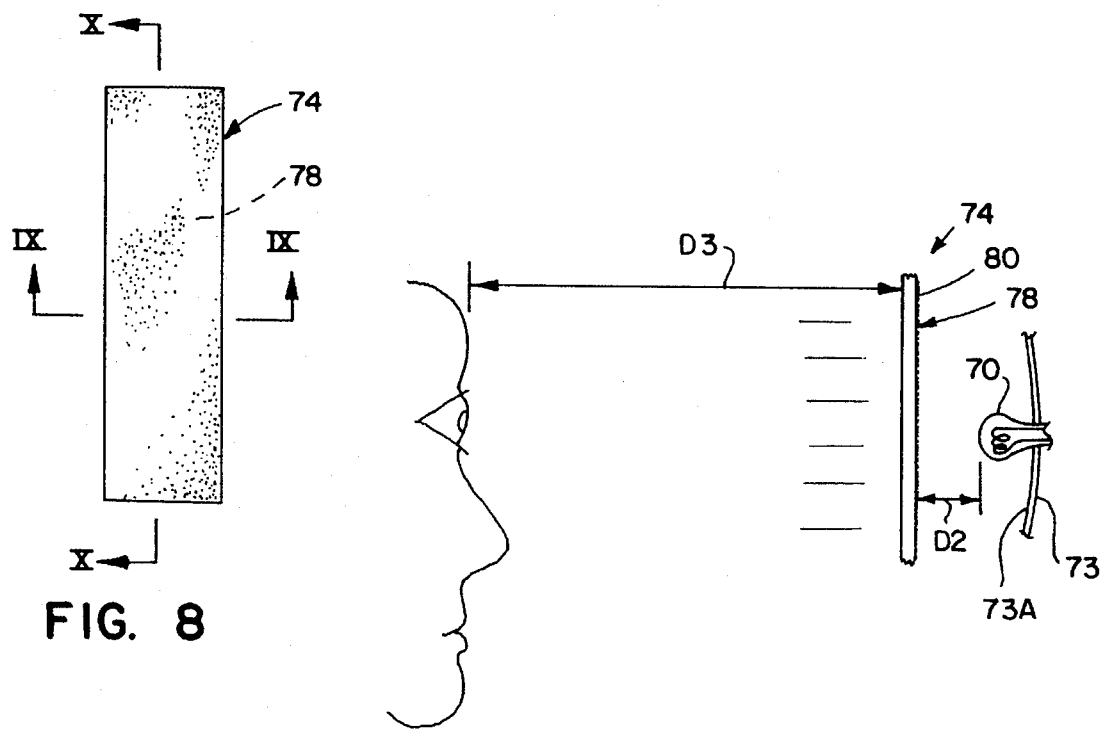
FIG. 8
FIG. 10
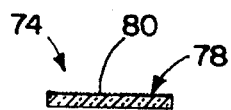
FIG. 9

VEHICLE VISOR

BACKGROUND OF THE INVENTION

The present invention relates to vehicle visors, and more particularly to a visor including an illuminated vanity mirror with a lens for uniformly distributing light onto a person's face.

Modern vehicles often include illuminated vanity mirrors mounted on sun visors in the passenger compartment of the vehicle. The lighted vanity mirrors include light sources and lens configured to provide light at a sufficient intensity and uniformity so that, for example, facial makeup can be applied by a user under low ambient light conditions. Various lighting configurations have been used with varying degrees of success. U.S. Pat. Nos. 4,486,819; 4,421,355 and 4,227,241 represent a few approaches that have been employed. Further improvements, however, are desired to provide better control over the size and uniformity of the light distribution from an illuminated visor along with a reduction in stray light and glare.

In particular, "prism" and "pillow" optics technology have been used in lenses of vehicle interior lighting accessories, in an effort to improve the uniformity of the light patterns formed by the lighting accessories. Prism optics technology, also called V-groove optics technology, uses a plurality of elongated triangularly-shaped prismatic surfaces to direct individual sections of light in desired directions as shown, for example, in the prior art of FIGS. 1–5. Pillow optics technology uses a plurality of small, dish-shaped depressions or protrusions on a lens surface to direct individual sections of light in desired directions as seen in FIG. 6. In effect, each dish-shaped depression or protrusion acts like a mini magnifying glass to direct the light in a predetermined direction. The size of these depressions or protrusions, their radii, and their relative orientation is predetermined through relatively extensive testing to achieve an acceptable pattern of light. The individual depressions can be substantially any size desired, but usually are in the range of about 1 mm×1 mm to about 2 mm×3 mm.

There are several particular problems associated with pillow optics lenses and prism optics lenses. These lens characteristically produce non-uniform light patterns such as glare, which is blinding, dazzling spots of light; "spider webbing," which is randomly oriented fine streaks of bright light having the appearance of a spider web; light/dark patchiness, which is relatively bright regions and adjacent relatively dark regions within the overall pattern; and chromatic aberrations, which are rainbow-like colored patterns at the edges of the lighted pattern.

With prism and pillow optics technology, it is possible to design individual sections of the lens to redistribute light from bright areas toward dark areas. However, it is typically not possible to control light rays sufficiently to eliminate non-uniformities in the light patterns. Such non-uniform light patterns are irritating to the human eye and make it difficult to use the light for very long or for fine tasks such as for applying makeup. Further, it is not uncommon to spend many hours of design, testing and redesign time in lenses incorporating these technologies to arrive at an acceptable light pattern before acceptable prototypes can be made. In the highly competitive automotive industry, such extensive testing and design time adds excessive cost to a product and can delay the introduction of new products.

Also, a lens including prism or pillow optics technology has a multi-surfaced crystal-like appearance that frequently does not compliment the non-glossy decor of the vanity mirror frame or other components in the vehicle passenger compartment, thus creating a less than desirable mismatched appearance. Nonetheless, lens including prism and pillow optics technology are generally accepted by the industry as two of the preferred ways of controlling/dispersing light into a predetermined pattern.

Another characteristic of prism and pillow optics technology is that these types of lenses must be spaced significantly from the light source in order to be effective. This results in a relatively thicker product, which is undesirable since passenger headroom is a problem in vehicle passenger compartments, especially in view of the proximity of a visor to a vehicle occupant's head to a visor in modern vehicles with radically sloped windshields and in view of governmental standards relating to occupant safety such as for crash testing. Additionally, the proximity of a pair of spaced vanity mirror light sources to a person's eyes can make it difficult for a vehicle passenger to see himself or herself since the lens spacing is close to that of the inter pupillary distance of a human's eyes. The inventors have discovered that bright spots can cause serious difficulty when trying to see one's self properly in such an illuminated vanity mirror. Still further, non-uniformity of light distribution, e.g. light and dark areas, also make it difficult to effectively use a visor vanity mirror. Therefore, an illuminated vanity mirror visor for uniformly illuminating a person's face and solving the aforementioned problems is desired.

SUMMARY OF THE INVENTION

A visor assembly for a vehicle includes a visor body having pivot or other means for attachment to the vehicle and a mirror. A light source is mounted to the visor body, and a lens attached to the visor body for controlling the distribution of light from the light source. The lens includes a surface having microvariations therein forming a holographic optical element that directs the light into a predetermined pattern for illuminating the face of a user. The holographic optical element eliminates undesirable uneven light distribution such as "spider webbing," patchiness and chromatic aberrations in and around the pattern provided by the lens. In one form, a mirror is mounted to the visor body with a light source positioned proximate opposite edges of the mirror such that a person's face can be uniformly illuminated and viewed in the mirror.

These and other features, objects and advantages of the present invention will be further understood by those of ordinary skill in the art by reference to the following specification, claims and appended drawings.

BRIEF DESCRIPTION OF THE DRAWINGS

FIG. 7 is a perspective view of a sun visor including a lighted visor vanity mirror embodying the present invention;

FIG. 8 is an enlarged front elevational view of the lens shown in FIG. 7;

FIG. 9 is a cross-sectional view taken along section line IX—IX in FIG. 8;

FIG. 10 is a fragmentary cross-sectional view taken along the lines X—X in FIG. 8 schematically illustrating the relative positioning of a viewer and a light source in respect to the lens;

DESCRIPTION OF PRIOR ART

Figure 1:
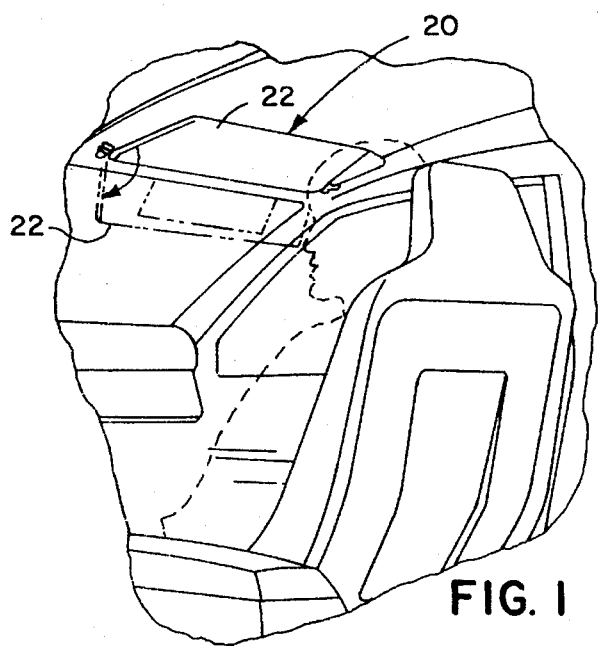
FIG. 1 is a rear perspective view of a vehicle interior including a prior art sun visor assembly including an illuminated vanity mirror.
Figure 5:
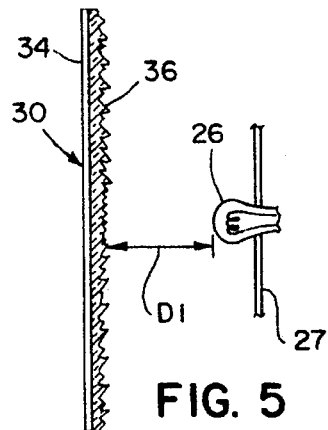
FIG. 5 is a fragmentary cross-sectional view taken along section line V—V in FIG. 3 and illustrating the relative position of a light source in the visor of FIG. 2.
Figure 4:
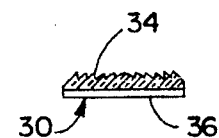
FIG. 4 is a fragmentary cross-sectional view taken along section line IV—IV in FIG. 3.
Figure 2:
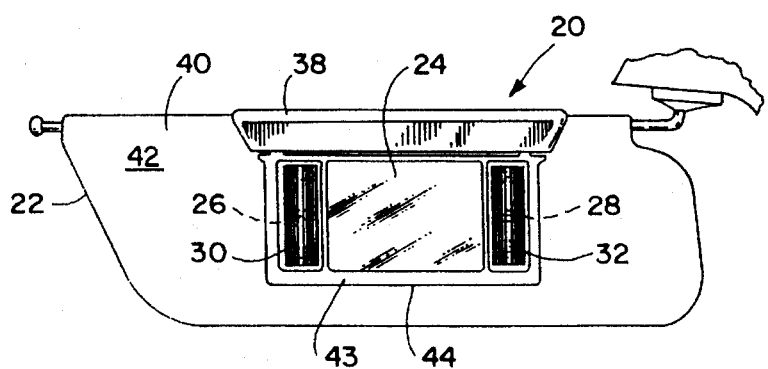
FIG. 2 is a front elevational view of the prior art visor assembly shown in FIG. 1.
Figure 3:
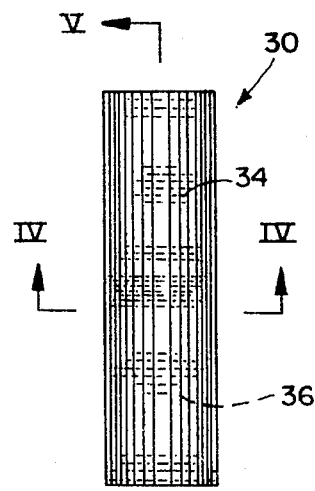
FIG. 3 is an enlarged front elevational view of the prior art lens shown in FIG. 2.

An exemplary sun visor 20 (FIGS. 1–5) in prior art may be of the type disclosed in U.S. Pat. No. 4,227,241 which includes a visor body 22 defining a recess for receiving a vanity mirror 24 positioned in the recess. A pair of identical light sources 26 and 28 are positioned on opposite sides of the mirror 24 with a pair of identical lenses 30 and 32 covering the light sources 26 and 28, respectively. The lenses 30 and 32 incorporate "prism optics" technology, sometimes also called "V-groove optics" technology, which uses a plurality of elongated triangularly-shaped prismatic surfaces on outer surface 34 (FIG. 4) and on inner surface 36 (FIG. 5) of the lenses to direct individual sections of light in desired directions. A reflector 27 (FIG. 5) reflects light from light sources 26 (and 28) toward lens 30 (and 32). The prismatic surfaces 34 and 36 extend generally in perpendicular directions so that the light is dispersed in two dimensions. A cover 38 is pivotally attached to visor body 22 for covering the mirror 24 and the lenses 30 and 32 when mirror 24 is not in use. A switch (not shown) is operably connected to cover 38 for activating light sources 26 and 28 when cover 38 is opened. Alternatively, a manual switch can be supplied. Lenses 30 and 32 are made of polycarbonate and have a generally clear, crystalline appearance facilitating light transfer through the lenses.

It is noted that the "prism optics" lenses 30 and 32 may typically have several characteristic problems including glare, which is blinding, dazzling spots of light; "spider webbing," which is randomly oriented fine streaks of bright light having the appearance of a spider web; light/dark patchiness, which is relatively bright regions and adjacent relatively dark regions within the overall pattern; and chromatic aberrations, which are rainbow-like colored patterns at the edges of the lighted pattern. Further, the clear crystalline appearance of the lenses 30 and 32 does not match the textured, non-glare surface 42 on the fabric material 40 covering most of visor body 22 or textured, non-glare surface 43 of structural member 44 of visor body 22.

In addition to the above noted problems, the lenses 30 and 32 must be spaced a significant distance D1 from the light source (i.e. typically about 6 mm) in order to be effective. This results in a relatively thick sun visor, which is undesirable since passenger headroom is a problem in vehicle passenger compartments, especially in view of governmental standards, such as for crash testing and in view of the proximity of the passenger's head to the visor. The inventors have discovered that at a normal viewing distance, such glare causes serious problems when trying to see one's self clearly in a mirror. Still further, non-uniformity of light distribution, e.g. light and dark areas, distracts from the effective use of the visor vanity mirror for application of makeup.

Figure 6:
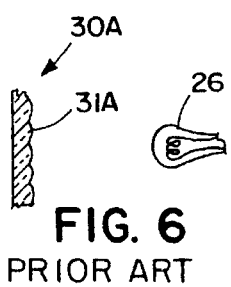
FIG. 6 is an enlarged fragmentary cross-sectional view of another prior art lens.

A modified prior art lens 30A (FIG. 6) includes "pillow optics" technology. In "pillow optics" lenses, a plurality of small, dish-shaped depressions or protrusions 31A are located on the inside of lens 30A. Each protrusion 31A acts like a mini-magnifying glass to direct light in a predetermined direction. However, the "pillow optics" lens also have problems such as glare, "spider webbing", light/dark patchiness, and chromatic aberrations. They also display an undesirable external appearance which frequently does not enhance the aesthetic appearance of a visor with such a lens.

DETAILED DESCRIPTION OF PREFERRED EMBODIMENT

A sun visor assembly 60 (FIGS. 7–10) embodying the present invention includes a visor body 62 including a mount for attachment to a vehicle, such as the illustrated pivot mount 64. Body 62 includes a mirror frame 63 mounted within a recess in one side of the visor body. A mirror 68 is secured in the frame 63 which also supports a pair of identical light sources 70 and 72 are positioned on opposing sides of mirror 68. If desired, a reflector 73 is positioned behind each of light sources 70 and 72. A pair of generally flat lens 74 and 76 are mounted to frame 63 to cover light sources 70 and 72. A cover 77 is pivotally attached to frame 63 for movement between an open position exposing mirror 68 for use and a closed position in which it covers the mirror 68 and lenses 74 and 76. The lenses 74 and 76 include inner surfaces 78 (or, alternatively, outer surfaces) having microvariations 80 therein forming a holographic optical element for emitting the light in a controlled pattern onto a person's face. The light pattern is substantially uniform and non-glaring, and the visor assembly thus provides a soft source of light that illuminates a person's face uniformly for optimal viewing. The mounting of the mirror frame to the visor body can be conventional, as can be the mounting of lenses 74 and 76 to the frame 63. The light sources are also conventionally mounted within the frame behind the lenses although in closer proximity (D2, FIG. 10) to the lenses than in the prior art. The lamps 70 and 72 are coupled to the vehicles electrical system through the cover actuated notch in a conventional manner.

The inner surface 78 of lenses 74 and 76 include microvariations 80 forming a holographic optical element that directs light into the predetermined pattern for illuminating a person's face. Lens 74 (and 76) is illustrated as being generally flat from side-to-side, although it is noted that a concave or convex lenses could also be provided. The microvariations 80 are substantially so small that individual microvariations are too small to be distinguishable by the naked eye. Microvariations 80 have a frosted or textured appearance that from the outside appearance of the lens which generally matches the textured finish on the frame 63 that extends around the perimeter of mirror 68. This provides a very attractive matching lens and frame surrounding mirror 68. Advantageously, the microvariations 80 and, more generally, the lens 74 (and 76) do not produce or reflect unwanted glare. The elimination of glare is particularly important in visor assembly 60 since at a normal viewing distance D3 (FIG. 10) from the user 84 to the lenses 74 (and 76) any undesirable glare makes it difficult to clearly see one's reflection in mirror 68.

To manufacture microvariations 80, a mirror image of the microvariations of a holographic optical element are formed in the surface of a mold for injection molding lenses 74 and 76. Alternatively, microvariations 80 can be embossed or vacuum formed onto the surface of lenses 74 and 76 after they are molded, or they can be formed in a film applied on the surface of tile lens itself after it is molded. The holographic optical element pattern used for the lens mold, embossing die, or post-molding-applied film is commercially available from the Physical Optics Corporation of Torrance, Calif. It basically consists of a surface holographic pattern formed by laser interferometry on a photo resist substrate. Subsequent to development, a metal master is made using conventional transfer processes which forms the surface of a mold subsequently employed to mold the lens.

Figure 11:
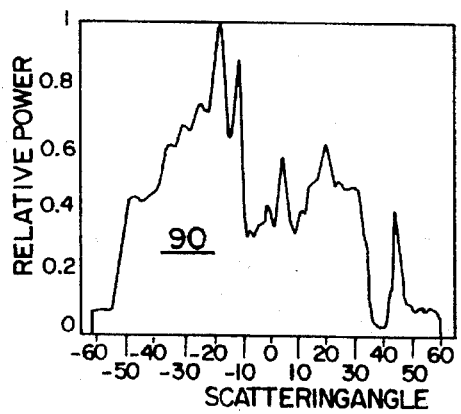
FIG. 11 is a light scatter diagram showing light scatter of untreated light from an exemplary light source.
Figure 12:
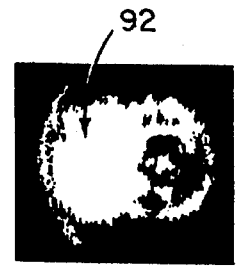
FIG. 12 is a schematic plan view of an untreated light pattern from the exemplary light source of FIG. 11.
Figure 13:
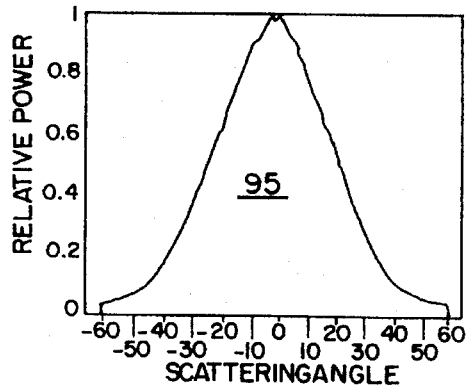
FIG. 13 is a light scatter diagram of the light pattern from the same source as shown in FIGS. 11–12 after passing through a lens including a holographic optical element for producing a circular pattern of light.
Figure 14:
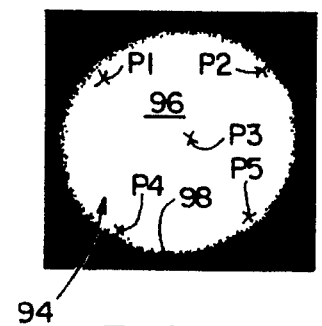
FIG. 14 is a schematic plan view of the light pattern resulting from the "circular pattern" holographic optical element for producing the circular scatter diagram of FIG. 13.
Figure 16:
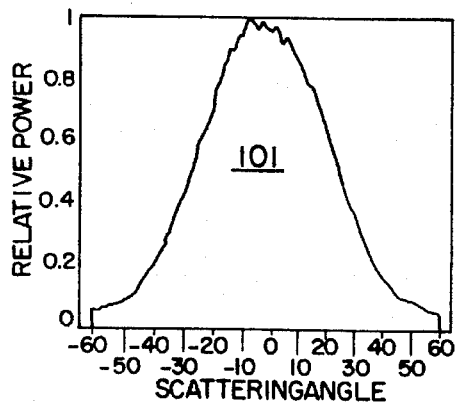
FIG. 16 is a light scatter diagram of the light pattern after the light has passed through a holographic optical element for producing an elliptical pattern of light as illustrated in FIG. 15.
Figure 17:
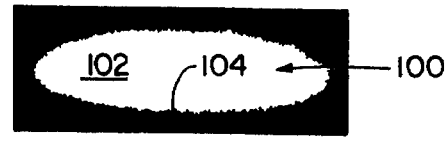
FIG. 17 is a schematic plan view of the elliptical light pattern produced by an "elliptical pattern" holographic optical element, as illustrated in FIG. 15.
Figure 15:
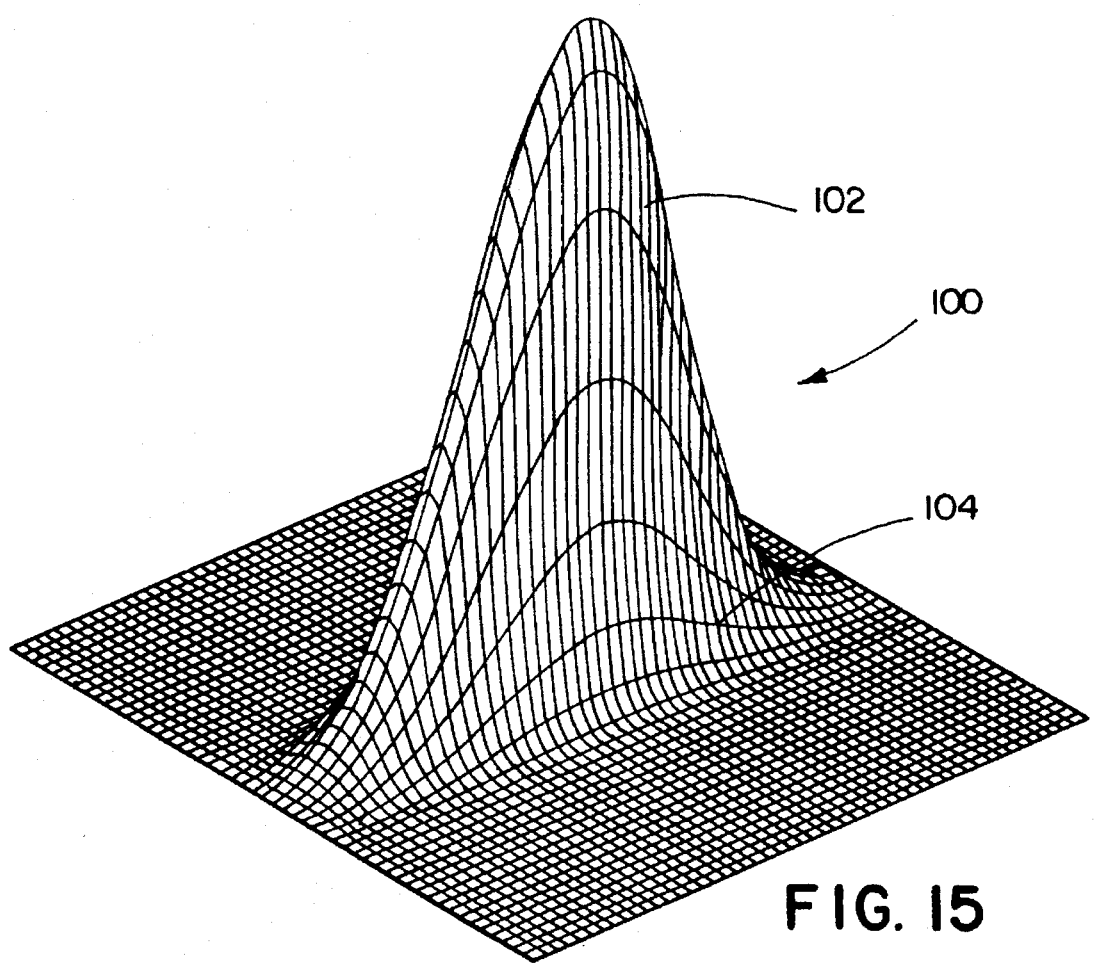
FIG. 15 is a three dimensional schematic diagram illustrating the distribution of light after the light has passed through a holographic optical element for producing an elliptical pattern.

The advantages of the uniform light pattern resulting from the use of the holographic optical element lens, and the absence of glare and other non-uniformities, are surprisingly effective in the environment of illuminated vanity mirror visor. The effectiveness of the holographic optical element lens is best seen by reference to FIGS. 11–17. In FIGS. 11–12, an untreated light source produces a non-uniform pattern as shown by pattern 92 (FIG. 12) and by the scatter diagram 90 (FIG. 11). However, the same light source treated by a holographic optical element for producing a circular pattern produces a pattern 94 (FIG. 14) with uniform central section 96 and edge 98 with uniform decreasing light intensity as shown in the scatter diagram 95 (FIG. 13). Also, a holographic optical element for producing an elliptical pattern produces a pattern 100 having a central section 102 and edge 104 with uniform decreasing light intensity as shown by the light scatter diagrams 101 and light pattern 100 of FIGS. 15–17.

The pattern emitted by visor assembly 60 in the vehicle is surprisingly and markedly more uniform than patterns from prior art vehicle light assemblies, and the undesirable non-uniformities in the prior art pattern are substantially eliminated. The pattern is substantially continuous within its central region, and quickly thins along boundary regions to a relatively well defined outer perimeter. Thus, there is relatively little or no stray light or glare produced by lenses 74 and 76.

An advantageous property of holographic optical element 80 is that the light sources 70 (and 72) can be positioned as near as a dimension D2 of about 0.7 mm from inner surface 78 of lens 74 (and 76) (FIG. 10). Contrastingly, the light source 26 (and 28) (FIG. 5) in the prior art assembly 20 must typically be a dimension D1 of about 6 mm from the lens 30 (and 32) including prism or pillow optics in order to be effective. Thus, visor assembly 60 can be manufactured in a significantly thinner body in the area of the mirror 68 and the light sources 70 and 72, such as about 15 mm or less. This compares to prior art sun visors that are usually about 20 mm or more in said area.

Another advantage is that holographic optical element 80 is more efficient and transmits significantly more lumens of light from the light source than prior art lenses, as shown in the Table I herebelow. For example, as shown in Table I below, the 20° angle circular device with holographic optical element has a total of 842 lux, while the prior art device including a pillow optics lens tested to have a total of only 779 lux. Still further, the holographic optical element can be constructed to yield a light pattern having a well defined desired shape and size. For example, in the three test devices, a first holographic optical element provided a predetermined circular pattern having a perimeter defined by light dispersed at a 20° angle. A second holographic optical element provided a predetermined elliptical pattern having a perimeter defined by light dispersed at a 10° angle on one axis and at a 20° angle on a second perpendicular axis. A third holographic optical element provided a predetermined elliptical pattern having a perimeter defined by light dispersed at a 5° angle on one axis and at a 20° angle on a second perpendicular axis. It is further noted that the lens 74 (and 76) can be relatively flat, or can be concave or convex and still have microvariations forming a holographic optical element for controlling light distribution. The points 1–5 in the Table I were taken generally at points P1–P5, respectively, at locations illustrated by the points P1–P5 in FIG. 14, from a substantially identical light source for each of the lenses.

TABLE I

|  | Lamp with pillow optics lens (See FIGS. 1 and 6)(Generally circular pattern) | Lamp with "holographic optic element" lens (See FIG. 14) (20° angle circular pattern) | Lamp with "holographic optic element " lens (See FIG. 17) (10° × 20° angle elliptical pattern) | Lamp with "holographic optic element " lens (See FIG. 17) (5° × 20° angle elliptical pattern) |
| --- | --- | --- | --- | --- |
| Point 1* | 62 lux | 58 | 58 | 56 |
| Point 2 | 213 lux | 188 | 125 | 102 |
| Point 3 (Center) | 255 lux | 328 | 418 | 514 |
| Point 4 | 109 lux | 128 | 115 | 92 |
| Point 5 | 140 lux | 140 | 138 | 119 |
| TOTAL | 779 lux | 842 | 854 | 883 |

*Points P1, P2, P4, and P5 are arranged in a generally rectangular pattern about point P3.

A holographic optical element can also be formed on the reflective surface 73A of reflector 73 (FIG. 10) to control the reflection of light from light source 70 toward lens 80. For example, reflective surface 73A is relatively flat and light source 80 is quite close to light source 70. Nonetheless, microvariations (80) defining a holographic optical element can be formed on surface 73A to focus the light frown light source 70 onto lens 80 with a predetermined distribution. Still further, it is noted that a holographic optical element can be formed on either the inside or outside surface of lens 74 (and 76).

Notably, it is contemplated that the light source for the lighted visor vanity mirror, in addition to being located on visor body 62 immediately adjacent mirror 68, can be located in other locations such as on the cover 77, such as on the visor body 62 but spaced from mirror 68, or such as on a vehicle headliner.

Thus, in this invention there is provided an illuminated visor assembly including a visor body, a light source, which may include a reflector, a lens for controlling the distribution of light from the light source, and a visor vanity mirror. The lens includes a surface with microvariations therein forming a holographic optical element that directs light in a predetermined pattern for illuminating an area. Advantageously, the holographic optical element substantially eliminates undesirable uneven light distribution.

In the foregoing description, it will be readily appreciated by those skilled in the art that modifications may be made to the invention without departing from the spirit or scope of the invention as defined by the appended claims.

The embodiments of the invention in which an exclusive property or privilege is claimed are defined as follows:

1. A visor assembly for a vehicle comprising:
   a visor body including a pivot for attachment to a vehicle;
   a mirror mounted on said visor body;
   a light source operably mounted to said visor body for supplying light; and
   a lens mounted to said visor body in spaced relationship to said light source for controlling the distribution of light from said light source, said lens including a surface with microvariations formed therein to define a holographic optical element that disperses the light into a predetermined even pattern, said visor being less than about 15 mm thick around the area of said mirror, said light source, and said lens.

2. A visor assembly as defined in claim 1 wherein said mirror is attached to said visor body proximate said lens.

3. A visor assembly as defined in claim 2 wherein said light source includes two lamps.

4. A visor assembly as defined in claim 3 wherein said two lamps are positioned on opposite sides of said mirror.

5. A visor assembly as defined in claim 1 including a cover pivotally attached to said visor body for selectively covering said mirror, said lens being attached to said visor body.

6. A visor assembly as defined in claim 1 wherein said light source emits light at an angle to said surface of said lens.

7. A visor assembly as defined in claim 1 wherein said predetermined pattern has an elliptical shape.

8. A visor assembly as defined in claim 1 wherein said microvariations are formed in said surface of said lens by molding-in-place.

9. A visor assembly as defined in claim 1 including a second light source and a second lens, both of which are spaced from said first light source and said first lens.

10. A visor assembly as defined in claim 1 including a reflector for reflecting light from said light source toward said lens, said reflector including a reflective surface having second microvariations defining a holographic optical element for dispersing reflected light in a controlled pattern.

11. A visor assembly as defined in claim 1 wherein said surface with microvariations is located on one of an inside and an outside of said lens.

12. A visor assembly as defined in claim 1 wherein said microvariations are formed in said surface by embossing said surface.

13. A visor assembly as defined in claim 1 wherein said microvariations are formed in said surface by vacuum forming said lens.

14. A visor assembly for a vehicle comprising:
   a visor body including a pivot for attachment to a vehicle;
   a mirror mounted on said visor body;
   a light source operably mounted to said visor body for supplying light;
   a lens mounted to said visor body in spaced relationship to said light source for controlling the distribution of light from said light source, said lens including a surface with microvariations formed therein to define a holographic optical element that disperses the light into a predetermined even pattern; and
   said visor body including a section having a textured exterior surface, said microvariations having a finely textured appearance that generally matches an appearance of said textured exterior surface of said section.

15. A visor assembly for a vehicle comprising:
   a visor body including a pivot for attachment to a vehicle;
   a mirror mounted on said visor body;
   a light source operably mounted to said visor body for supplying light;
   a lens mounted to said visor body in spaced relationship to said light source for controlling the distribution of light from said light source, said lens including a surface with microvariations formed therein to define a holographic optical element that disperses the light into a predetermined even pattern; and
   said light source being located less than 6 mm from an inner surface of said lens.

16. A visor assembly as defined in claim 15 wherein said light source is located less than about 0.7 mm from the inner surface of said lens.

17. A visor assembly for a vehicle comprising:
   a visor body including a bracket for attaching said body to a vehicle;
   a vanity mirror mounted to said visor body;
   at least one light source positioned in said visor body adjacent said vanity mirror; and
   a lens covering said light source, said lens positioned proximate said at least one light source and including a surface with microvariations therein forming a holographic optical element that disperses light from said light source into a predetermined even pattern, said visor body, said vanity mirror, said at least one light source, and said lens having a total thickness less than about 15 mm.

18. A visor assembly as defined in claim 17 including a second light source positioned in said visor body on a side of said vanity mirror opposite from said first light source, and further including a second lens mounted to said visor body having microvariations forming a holographic optical element for covering said second light source.

19. A visor assembly as defined in claim 17 wherein said bracket pivotally mounts said visor body to the vehicle.

20. A visor assembly for a vehicle comprising:
 a visor body including a bracket for attaching said body to a vehicle;
 a vanity mirror mounted to said visor body;
 at least one light source positioned in said visor body adjacent said vanity mirror;
 a lens covering said light source, said lens positioned proximate said at least one light source and including a surface with microvariations therein forming a holographic optical element that disperses light into a predetermined even pattern; and
 a distance from said light source to said lens being less than about 6 mm.

* * * * *